(12) United States Patent
Odom et al.

(10) Patent No.: US 7,716,207 B2
(45) Date of Patent: May 11, 2010

(54) SEARCH ENGINE METHODS AND SYSTEMS FOR DISPLAYING RELEVANT TOPICS

(76) Inventors: Paul S. Odom, c/o Scientigo Inc., 6701 Carmel Rd., Suite 205, Charlotte, NC (US) 28226; Dennis Kotlar, c/o Scientigo Inc., 6701 Carmel Rd., Suite 205, Charlotte, NC (US) 28226

( * ) Notice: Subject to any disclaimer, the term of this patent is extended or adjusted under 35 U.S.C. 154(b) by 233 days.

(21) Appl. No.: 11/712,557

(22) Filed: Mar. 1, 2007

(65) Prior Publication Data

US 2007/0265996 A1   Nov. 15, 2007

Related U.S. Application Data

(63) Continuation-in-part of application No. 10/086,026, filed on Feb. 26, 2002, now Pat. No. 7,340,466.

(60) Provisional application No. 60/777,576, filed on Mar. 1, 2006.

(51) Int. Cl.
*G06F 7/00* (2006.01)
(52) U.S. Cl. .................. 707/708; 707/705; 707/706; 707/723
(58) Field of Classification Search .................. 707/1–5
See application file for complete search history.

(56) References Cited

U.S. PATENT DOCUMENTS

| | | |
|---|---|---|
| 4,580,218 A | 4/1986 | Raye |
| 5,265,065 A | 11/1993 | Turtle |
| 5,490,061 A | 2/1996 | Tolin et al. |
| 5,625,748 A | 4/1997 | McDonough et al. |
| 5,745,776 A | 4/1998 | Sheppard, II |
| 5,842,206 A | 11/1998 | Sotomayor |
| 5,924,105 A | 7/1999 | Punch, III et al. |
| 5,937,422 A | 8/1999 | Nelson et al. |
| 5,940,821 A | 8/1999 | Wical |
| 5,960,385 A | 9/1999 | Skiena et al. |
| 5,987,454 A | 11/1999 | Hobbs |
| 5,987,460 A | 11/1999 | Niwa et al. |

(Continued)

OTHER PUBLICATIONS

"Autonomy Server: Product Brief." 2 pgs. Accessed Feb. 22, 2002. (http://www.autonomy.com/perl/Register.perl?doc=/autonomy_v3/Media/Collaterals/Product_Briefs/PB_Autonomy/Server_02.01.pdf).

(Continued)

*Primary Examiner*—Etienne P LeRoux
*Assistant Examiner*—Cindy Nguyen
(74) *Attorney, Agent, or Firm*—Dorsey & Whitney LLP

(57) ABSTRACT

The present invention provides search engine methods and systems for displaying relevant and timely topics. In an embodiment, a method for displaying topics related to a search constraint entered by a user includes receiving a search constraint; identifying a first preliminary set of topics related to the search constraint, wherein the first preliminary set of topics are representative of a sample set of general data items; identifying a second preliminary set of topics related to the search constraint, wherein the second preliminary set of topics is representative of a sample set of current event data items; identifying a set of display topics that is a subset of the first preliminary set of topics and the second preliminary set of topics; and displaying the set of display topics. In other embodiments, other systems and methods are provided.

25 Claims, 13 Drawing Sheets

U.S. PATENT DOCUMENTS

| | | | |
|---|---|---|---|
| 6,038,560 | A | 3/2000 | Wical |
| 6,070,133 | A | 5/2000 | Brewster et al. |
| 6,085,187 | A | 7/2000 | Carter et al. |
| 6,115,718 | A | 9/2000 | Huberman et al. |
| 6,125,362 | A | 9/2000 | Elworthy |
| 6,212,532 | B1 | 4/2001 | Johnson et al. |
| 6,226,792 | B1 | 5/2001 | Goiffon et al. |
| 6,233,575 | B1 | 5/2001 | Agrawal et al. |
| 6,236,958 | B1 | 5/2001 | Lange et al. |
| 6,363,378 | B1 | 3/2002 | Conklin et al. |
| 6,446,061 | B1 | 9/2002 | Doerre et al. |
| 6,460,034 | B1 | 10/2002 | Wical |
| 6,473,730 | B1 | 10/2002 | McKeown et al. |
| 6,505,151 | B1 | 1/2003 | Chou et al. |
| 6,529,902 | B1 | 3/2003 | Kanevsky et al. |
| 6,556,987 | B1 | 4/2003 | Brown et al. |
| 6,606,659 | B1 | 8/2003 | Hegli et al. |
| 6,665,661 | B1 | 12/2003 | Crow et al. |
| 6,678,694 | B1 | 1/2004 | Zimmermann et al. |
| 6,751,611 | B2 | 6/2004 | Krupin et al. |
| 6,772,170 | B2 | 8/2004 | Pennock et al. |
| 6,775,677 | B1 | 8/2004 | Ando et al. |
| 6,941,513 | B2 | 9/2005 | Meystel et al. |
| 7,113,943 | B2 | 9/2006 | Bradford et al. |
| 7,251,600 | B2 | 7/2007 | Ju et al. |
| 7,286,978 | B2 | 10/2007 | Huang et al. |
| 7,305,415 | B2 | 12/2007 | Vernau et al. |
| 7,321,850 | B2 | 1/2008 | Wakita |
| 7,496,567 | B1 * | 2/2009 | Steichen ............ 707/3 |
| 2002/0046018 | A1 | 4/2002 | Marcu et al. |
| 2002/0099730 | A1 | 7/2002 | Brown et al. |
| 2003/0154071 | A1 | 8/2003 | Shreve |
| 2004/0024583 | A1 | 2/2004 | Freeman |
| 2004/0024739 | A1 | 2/2004 | Copperman et al. |
| 2004/0024752 | A1 * | 2/2004 | Manber et al. ............ 707/3 |
| 2004/0128267 | A1 | 7/2004 | Berger et al. |
| 2004/0199375 | A1 | 10/2004 | Ehsani et al. |
| 2008/0021860 | A1 * | 1/2008 | Wiegering et al. ............ 707/1 |

OTHER PUBLICATIONS

"Autonomy Technology White Paper", 19 pgs. Accessed Feb. 22, 2002. (http://www.autonomy.com/perl/Register.perl?doc=/autonomy_v3/Media/CollateraIs/Autonomy_White_Papers/Autonomy_Technology_WP_0401.pdf).

"DolphinSearch Proprietary Information", 10 pgs. Accessed Feb. 22, 2002. (http://www.dolphinsearch.com/downloads/dsWhitePaper2001.pdf).

"DolphinSearch Technology Summary", 2 pgs. Accessed Feb. 22, 2002. (http://www.dolphinsearch.com/downloads/Technology_Summary.pdf).

"Verity Intelligent Classification: Turn Information Assets into Competitive Advantage", 13 pgs. Accessed Feb. 22, 2002. (http://www.verity.com/pdf/MK0349_int_class_wp.pdf).

"Verity K2 Architecture: Unprecedented Performance, Scalability and Fault Tolerance", 9 pgs. Accessed Feb. 22, 2002. (http://www.verity.com/pdf/MK0366_K2Arch_WP.pdf).

"Verity Search: The Advantages of Advanced Information Retrieval", 13 pgs. Accessed Feb. 22, 2002. (http://www.verity.com/pdf/MK0348_Search_WP.pdf).

* cited by examiner

FIG. 10

pittsburgh steelers  [FIND]

MOBILESEARCH
Enter your cell # to recieve a text menu of services from upsnap.com Select your operator
[Send]

AUTOTOPICS
autographed photos
cap number
career receptions
coach bill
duplicate form
Franco Harris
free agency
Hines Ward
machine dry
NFL Equipment
NFL shield
passing yardage
Pittsburgh Post
placing NFL
pretty wife
Star Productions
steelers fan
steelers football
trademarks national
yard running ---
find what your looking for?
comments/suggestions

Pittsburgh Steelers Products Galore
Find a vast selection of Pittsburgh Steelers products at FansEdge. Jersey, apparel, collecti low prices and $4.99 flat rate shipping.
www.fansedge.com

Pittsburgh Steelers Super Bowl XL Items
Steelers Super Bowl XL Champions merchandise and collectibles, including coins, flags, pi items, commemorative footballs, bumper stickers and more.
hotmarketsports.com

BK® and the NFL
Want you to Have It Your Way®? Build your own WHOPPER® sandwich.
www.whopperettes.com

---

Official site of the Pittsburgh Steelers - Home Page
The official site of the Pittsburgh Steelers ...
ColtsDolphinsJaguarsJetsPatriotsRaidersRavensSteelersTexansTitans ... DVD Now have the chance to enjoy ... Bettis studio bound next season. Steelers Super Bowl P media3.steelers.com

SteelersLIVE.com - Pittsburgh Steelers - PittsburghLIVE.com
Coverage of the Pittsburgh Steelers including, schedules, results, news, stats and ro Total Media NEWSPAPERS Pittsburgh Trib Tribune-Review Valley News Dispatch \ expected on Steelers' radar. Don't expect a marquee player ...
www.pittsburghlive.com

NFL.com - Pittsburgh Steelers Team News
It didn't take Jerome Bettis long to land a job after football following his retirement. B broadcast team at NBC Sports as part of its Sunday Night Football studio show. ... e Steelers. " I think first ... RaidersRamsRavensRedskinsSaintsSeahawksSteelersTex. information about upcoming Steelers features and live chat ...
www.nfl.com

ESPN.com: Pittsburgh Steelers Clubhouse
... limited-edition ketchup bottles to celebrate the Pittsburgh Steelers' Super Bowl wir Philadelphia Eagles Pittsburgh Steelers San Diego Chargers San Francisco ...

SEARCH ENGINE METHODS AND SYSTEMS FOR DISPLAYING RELEVANT TOPICS

CROSS REFERENCE TO RELATED APPLICATIONS

The present application is a continuation-in-part of U.S. patent application Ser. No. 10/086,026, entitled Topic Identification and Use Thereof in Information Retrieval Systems, filed on Feb. 26, 2002 by Paul S. Odom et. al. ("026 Patent Application"), which is hereby expressly incorporated by reference herein in its entirety.

The present application also claims priority to U.S. Provisional Patent Application No. 60/777,576, filed Mar. 1, 2006, entitled Search Engine Methods and Systems for Displaying Relevant Topics, which is hereby expressly incorporated by reference herein in its entirety.

BACKGROUND OF THE INVENTION

1. Field of the Invention

The present invention relates to search engines, and more particularly, to search engine methods and systems that provide relevant and timely topics.

2. Background of Invention

The world economic order is shifting from one based on manufacturing to one based on the generation, organization and use of information. To successfully manage this transition, organizations must collect and classify vast amounts of data so that it may be searched and retrieved in a meaningful manner. Traditional techniques to classify data may be divided into four approaches: (1) manual; (2) unsupervised learning; (3) supervised learning; and (4) hybrid approaches.

Manual classification relies on individuals reviewing and indexing data against a predetermined list of categories. For example, the National Library of Medicine's MEDLINE® (Medical Literature, Analysis, and Retrieval System Online) database of journal articles uses this approach. While manual approaches benefit from the ability of humans to determine what concepts a data represents, they also suffer from the drawbacks of high cost, human error and relatively low rate of processing. Unsupervised classification techniques rely on computer software to examine the content of data to make initial judgments as to what classification data belongs to. Many unsupervised classification technologies rely on Bayesian clustering algorithms. While reducing the cost of analyzing large data collections, unsupervised learning techniques often return classifications that have no obvious basis on the underlying business or technical aspects of the data.

This disconnect between the data's business or technical framework and the derived classifications make it difficult for users to effectively query the resulting classifications. Supervised classification techniques attempt to overcome this drawback by relying on individuals to "train" the classification engines so that derived classifications more closely reflect what a human would produce.

Illustrative supervised classification technologies include semantic networks and neural networks. While supervised systems generally derive classifications more attuned to what a human would generate, they often require substantial training and tuning by expert operators and, in addition, often rely for their results on data that is more consistent or homogeneous that is often possible to obtain in practice. Hybrid systems attempt to fuse the benefits of manual classification methods with the speed and processing capabilities employed by unsupervised and supervised systems. In known hybrid systems, human operators are used to derive "rules of thumb" which drive the underlying classification engines.

No known data classification approach provides a fast, low-cost and substantially automated means to classify large amounts of data that is consistent with the semantic content of the data itself. Thus, it would be beneficial to provide a mechanism to determine a collection of topics that are explicitly related to both the domain of interest and the data corpus analyzed. Commonly owned, co-pending U.S. patent application, Ser. No. 10/086,026, entitled Topic Identification and Use Thereof in Information Retrieval Systems, filed on Feb. 26, 2002 by Paul Odom, provides such a mechanism.

At the same time, the emergence of the Information Age has created a wealth of information that is available electronically. Unfortunately, much of this information is often inaccessible to individuals because they do not know where to look for it, or if they do know where to look the information can not be found efficiently. For example, an individual is working at his desk and his boss requests that he find an electronic copy of a memo that the individual sent last month. The memo contains information that was obtained from a website, which included a spreadsheet that had data extracted from a division report.

The boss would like the individual to send a copy of the email and the references back to him as soon as possible. Also, he would like the individual to check for additional references to see if the conclusions in the memo need to be updated. The boss requires that the project be completed within fifteen minutes. The worker is not disorganized, but as is common, does not have total recall of how the information was gathered or where the email is stored. After thirty minutes, the worker finally finds the email. But, the worker still needs to search for additional information as requested by his boss. The end result is that because no efficient search mechanism existed the worker has missed his boss' deadline.

The above example commonly occurs within the workplace, and involves not just email, but all forms of electronically stored information. Human worker studies show that it is not unusual for some office workers to spend more than 10% of each work day looking for information. The same studies claim that less than half those searches are successful. Databases, data warehouses, document management systems, and file searches are often too difficult or "hit and miss" to be used effectively and efficiently. Corporate enterprises and government organizations have spent billions of dollars to aggregate and integrate information, so it will be more accessible. Of course, an individual can get answers if he is a database or document system expert and if the individual remembers the exact title, the exact phrasing used in the document, or the ever elusive primary key associated with the document of interest. Unfortunately, more common than not, this level of detail is not available to assist in finding the information.

Internet based searches are often times even more frustrating, and less productive. For example, it is not particularly useful when you know that there are approximately 6,120,000 answers to the search criteria you just entered. Ads associated with search engines are also often frustratingly irrelevant to a search and therefore of little interest to the users and of minimal value to the advertiser. The search engine ads try to identify promising content to be associated with. Unfortunately, these are often not very relevant either. For example, you entered "plasma injectors" and you get several ads for plasma televisions. Individuals have learned that keyword ads are not usually very useful, so individuals often completely ignore keyword ads.

Furthermore, because website popularity has nothing to do with what might be relevant in the thousands of search results, search results driven by website popularity can often lead to useless results. Meanwhile, at search engine operations facility there is an army of personnel and massive server farms humming away to potentially deliver hundreds of thousands of results to every search query that an individual enters.

Web searching, search advertising, and enterprise searching are not consistently providing acceptable search resolution for the user. The missing ingredient in current search technology is "true relevance". Relevance can only be defined by the user for a specific search. Relevancy has no predictable pattern. No generalized algorithm is going to repeatably produce relevant information, because in the end, any generalization is arbitrary.

What has occurred, so far in the industry, is a fragmentation of search applications as vendors try to address niche search markets in an attempt to improve relevancy by narrowing the domain. For example, sites that are product specific, area-of-interest specific, group specific, or subject specific, have all been implemented. So far, there have been no successful generalized search applications that consistently provide high levels of relevancy.

Present search and topification algorithms generally assume that topics are relatively static. However, the relevance of topics to a particular search query is not only based on what appears in the content of the query, but the relevance can also be a function of current events. For example, if an individual had conducted a search of the Internet in January 2006 using the search string "NFL," then one would expect the topics Denver vs. Pittsburgh and Charlotte vs. Seattle to be of interested, since these were the team pairings in the American Football Conference and National Football Conference championship games. This set of topics is time sensitive to the playoffs. While a search engine may have these topics in its database, these topics would be part of tens of thousands of possible topic results for a query using the term "NFL." During the January 2006 time frame, the "Denver vs. Pittsburgh" and "Charlotte vs. Seattle" topics would likely be a very meaningful topic result. Unfortunately, search engines do not directly factor in time relevancy, and these topics would be mixed in with the tens of thousands of other possible topic results. Thus, a user would not likely receive as relevant search results as would be desired.

Another shortcoming of current search engines that display topics or search results is that search engines do not display topics associated with every subject matter domain related to a search constraint entered by a user. Rather a search engine may only show search results or topics that are most popular without regard to different subject matter domains that search results may belong to. For example, when a user enters the search constraint, Jaguar. The data items belonging to the search results may include topics that correspond to subject matter domains that include autos (e.g., there is a car named Jaguar), animals (e.g., there is an animal called Jaguar), software (e.g., there is a software package referred to as Jaguar), resorts (e.g., there are resorts in South America referred to as Jaguar resorts), football (e.g., there is a football team referred to as the Jacksonville Jaguars) and game (e.g., there is a game referred to a Jaguar). Those search engines that provide results based only on popularity of website hits, might only display topics or search results associated with the subject matter domain Auto. Or, at the very least, items associated with Resorts would be on page 27 of the search results. More often than not, a user probably would be looking for data items in the subject matter domain Auto. However, a reasonable proportion of users may also be interested in other domains that may be less popular. For these users, the search results displayed would not be particularly relevant and their specific areas of interest difficult to find. Thus, a user once again may not receive search results relevant to their particular area of interest.

What are needed are search methods and systems that can efficiently generate search results to identify and display topics by considering, at any given time, the relative significance of a topic based on current events and that ensure coverage of all subject matter domains associated with a search constraint.

SUMMARY OF THE INVENTION

The present invention provides search engine methods and systems for displaying relevant and timely topics.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

FIG. 10 provides a screen shot of a search engine web site, according to an embodiment of the invention.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Topification

Techniques (methods and devices) to generate domain specific topics for a corpus of data are described. Other techniques (methods and devices) to associate the generated topics with individual documents, or portions thereof, for use in electronic search actions are also described. The following embodiments of the inventive techniques are illustrative only and are not to be considered limiting in any respect.

In one embodiment of the invention, a collection of topics is determined for a first corpus of data, wherein the topics are domain specific, based on a statistical analysis of the first data, corpus and substantially automatically generated. In another embodiment of the invention, the topics may be associated with each "segment" of a second corpus of data, wherein a segment is a user-defined quantum of information. Example segments include, but are not limited to, sentences, paragraphs, headings (e.g., chapter headings, titles of manuscripts, titles of brochures and the like), chapters and complete documents. Data comprising the data corpus may be unstructured (e.g., text) or structured (e.g., spreadsheets and database tables). In yet another embodiment of the invention, topics may be used during user query operations to return a result set based on a user's query input.

Figure 1:
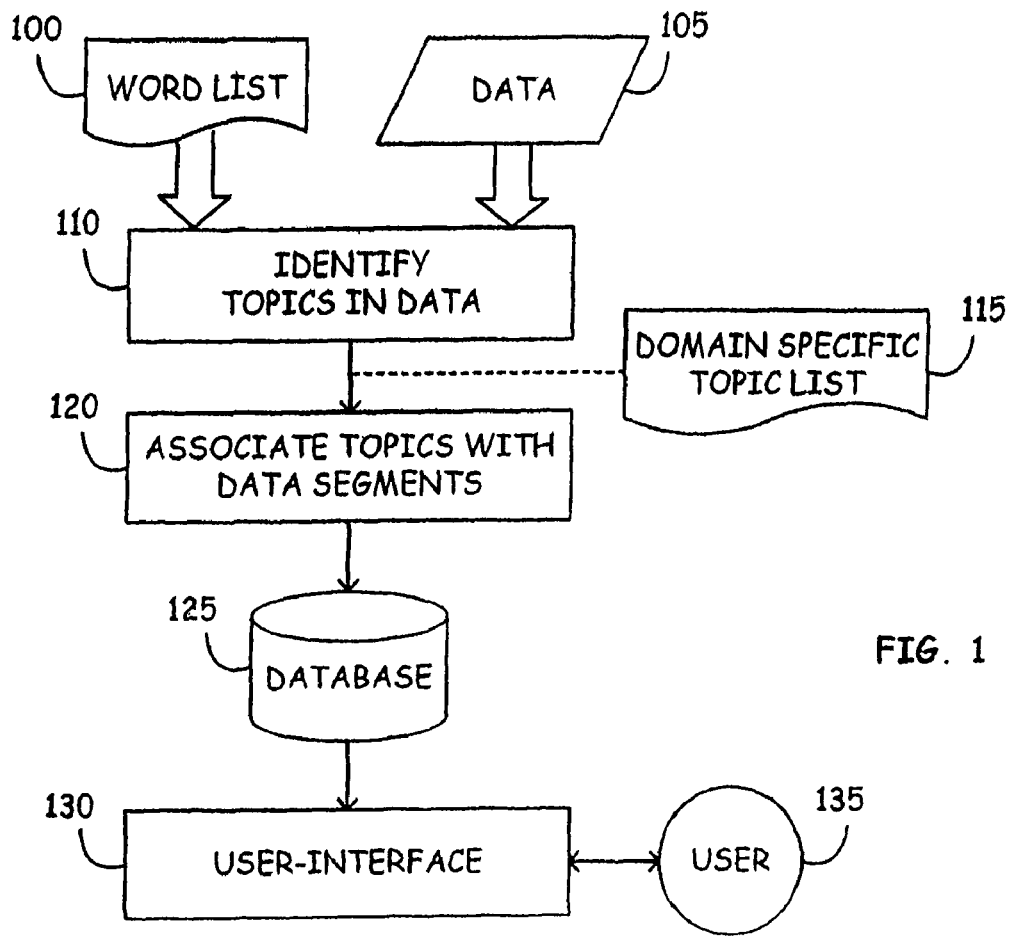
FIG. 1 is a flowchart of a method to identify topics in a corpus of data in accordance with one embodiment of the invention.

Referring to FIG. 1, one method in accordance with the invention uses domain specific word list 100 as a starting point from which to analyze data 105 (block 110) to generate domain specific topic list 115. Once generated, topic list 115 entries may be associated with each segment of data 105 (block 120) and stored in database 125 where it may be queried by user 135 through user interface 130. Word list 100 may comprise a list of words or word combinations that are meaningful to the domain from which data 105 is drawn. For example, if data 105 represents medical documents then word list 100 may be those words that are meaningful to the medical field or those subfields within the field of medicine relevant to data 105. Similarly if data 105 is drawn from the accounting, corporate governance, or the oil processing and refining business, word list 100 will comprise words that hold particular importance to those fields. Data 105 may be substantially any form of data, structured or unstructured. In one embodiment, data 105 comprises unstructured text files such as medical abstracts and/or articles. In another embodiment, data 105 comprises books, newspapers, magazine content or a combination of these sources. In still another embodiment, data 105 comprises structured data such as design documents and spreadsheets describing an oil refinery process. In yet other embodiments, data 105 comprises content tagged image data, video data and/or audio data. In still another embodiment, data 105 comprises a combination of structured and unstructured data. Data 105 may also include data gathered from across a network, such as the Internet.

Acts in accordance with block 110 use word list 100 entries to statistically analyze data 105 on a segment-by-segment basis. In one embodiment, a segment may be defined as a sentence and/or heading and/or title. In another embodiment, a segment may be defined as a paragraph and/or heading and/or title. In yet another embodiment, a segment may be defined as a chapter and/or heading and/or title. In still another embodiment, a segment may be defined as a complete document and/or heading and/or title. Other definitions may be appropriate for certain types of data and, while different from those enumerated here, would be obvious to one of ordinary skill in the art. For example, headings and titles may be excluded from consideration. It is noted that only a portion of data 105 need be analyzed in accordance with block 110. That is, a first portion of data 105 may be used to generate topic list 115, with the topics so identified being associated with the entire corpus of data during the acts of block 120.

TABLE 1

Example Data

By way of example only, in one embodiment data 105 comprises the text of approximately 12 million abstracts from the Medline ® data collection. These abstracts include approximately 2.8 million unique words, representing approximately 40 Gigabytes of raw data. MEDLINE ® (Medical Literature, Analysis, and Retrieval System Online) is the U.S. National Library of Medicine's (NLM) bibliographic database of journal articles covering basic biomedical research and the clinical sciences including: nursing, dentistry, veterinary medicine, pharmacy, allied health, pre-clinical sciences, environmental science, marine biology, plant and animal science, biophysics and chemistry. The database contains bibliographic citations and author abstracts from more than 4,600 biomedical journals published in the United States and 71) other countries. Medline M is searchable at no cost from the NLM's web site at http://www.nlm.nih.gov.

Figure 2:
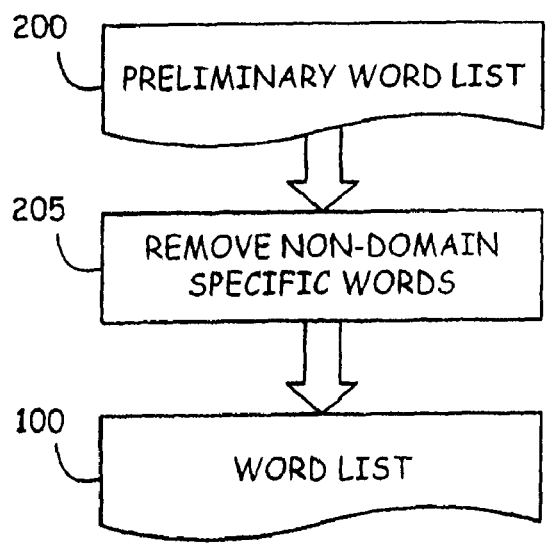
FIG. 2 is a flowchart of a method to generate a domain specific word list in accordance with one embodiment of the invention.

Referring to FIG. 2, in one embodiment of the invention word list 100 may be generated by first compiling a preliminary list of domain specific words 200 and then pruning from that list those entries that do not significantly and, (r uniquely identify concepts or topics within the target domain (block 205). Preliminary list 200 may, for example, be comprised of words from a dictionary, thesaurus, glossary, domain specific word list or a combination of these sources. For example, the Internet may be used to obtain preliminary word lists for virtually any field. Words removed in accordance with block 205 may include standard STOP words as illustrated in Table 2. (One of ordinary skill in the art will recognize that other STOP words may be used.) In addition, it may be beneficial to remove words from preliminary word list 200 that are not unique to the larger domain. For example, while the word "reservoir" has a particular meaning in the field of oil and gas development, it is also a word of common use. Accordingly, it may be beneficial to remove this word from a word list specific to the oil and gas domain. In one embodiment, a general domain word list may be created that comprises those words commonly used in English (or another language), including those that are specific to a number of different domains. This "general word list" may be used to prune words from a preliminary domain specific word list. In another embodiment, some common words removed as a result of the general word list pruning just described may be added back into preliminary word list 200 because, while used across a number of domains, have a particular importance in the particular domain.

TABLE 2

Example Stop Words a, about, affect. after, again, all, along, also, although, among, an, and, another, any, anything, are, as, at, be, became, because, been, before, both, but, by, can, difference, each, even, ever, every, everyone, for, from, great. had, has. have, having, he, hence, here, his, how, however, I, if, in, inbetween, into, is, it, its, join, keep, last, lastly, let, many, may, me, more, most, much, next, no, none, not, nothing, now, of, on, only, or, other, our, pause, quickly, quietly, relationship, relatively, see, she, should, since, so, some, somebody, someone, something, sometimes, successful, successfully, such, take, than, that, the, their, there, these, they, this, those, thus, to, unusual, upon, us, use, usual, view, was, we, went, what, when, whence, where, whether,, which, while, who, whose, will, with, within, without, yes, yet, you, your

TABLE 3

Example Word List

For the data set identified in Table 1, preliminary word list 200 was derived from the Unified Medical language System Semantic Network (see http:/www.nlm.nih.gov/datebases/leased.html#umls) and included 4,000,000 unique single-word entries. Of these, roughly 3,945,000 were moved in accordance with block 205. Accordingly, word list 100 comprised approximately 55,000 one word entries. Example word list 200 entries for the medical domain include: abdomen, biotherapy, chlorided, distichiasis, enzyme, enzymes, freckle, gustatory, immune, kyphoplasty, laryngectomy, malabsorption, nebulize, obstetrics, pancytcpenia, quadriparesis, retinae, sideeffect, tonsils, unguiuml, Vennicular, womb, xerostornia, yersinia, and zygote.

Conceptually, word list 100 provides an initial estimation of domain specific concepts/topics. Analysis in accordance with the invention beneficially expands the semantic breadth of word list 100, however, by identifying word collections (e.g., pairs and triplets) as topics (i.e., topic list 115). Once topics are identified, each segment in data 105 may be associated with those topics (block 120) that exist in that segment. Accordingly, if a corpus of data comprises information from a plurality of domains, analysis in accordance with FIG. 1 may be run multiple times—each time with a different word list 100. (Alternatively, each segment may be analyzed for each domain list before a next segment is analyzed.) In this manner, undifferentiated data (i.e., data not identified as belonging to one or another specific domain) may be automatically analyzed and "indexed" with topics. It is noted that word list 100 may be unique for each target domain but, once developed, may be used against multiple data collections in that field. Thus, it is beneficial to refine the contents of word list 100 for each domain so as to make the list as domain-specific as possible. It has been empirically determined that tightly focused domain-specific word lists yield a more concise collection of topics which, in turn, provide improved search results (see discussion below).

Figure 3:
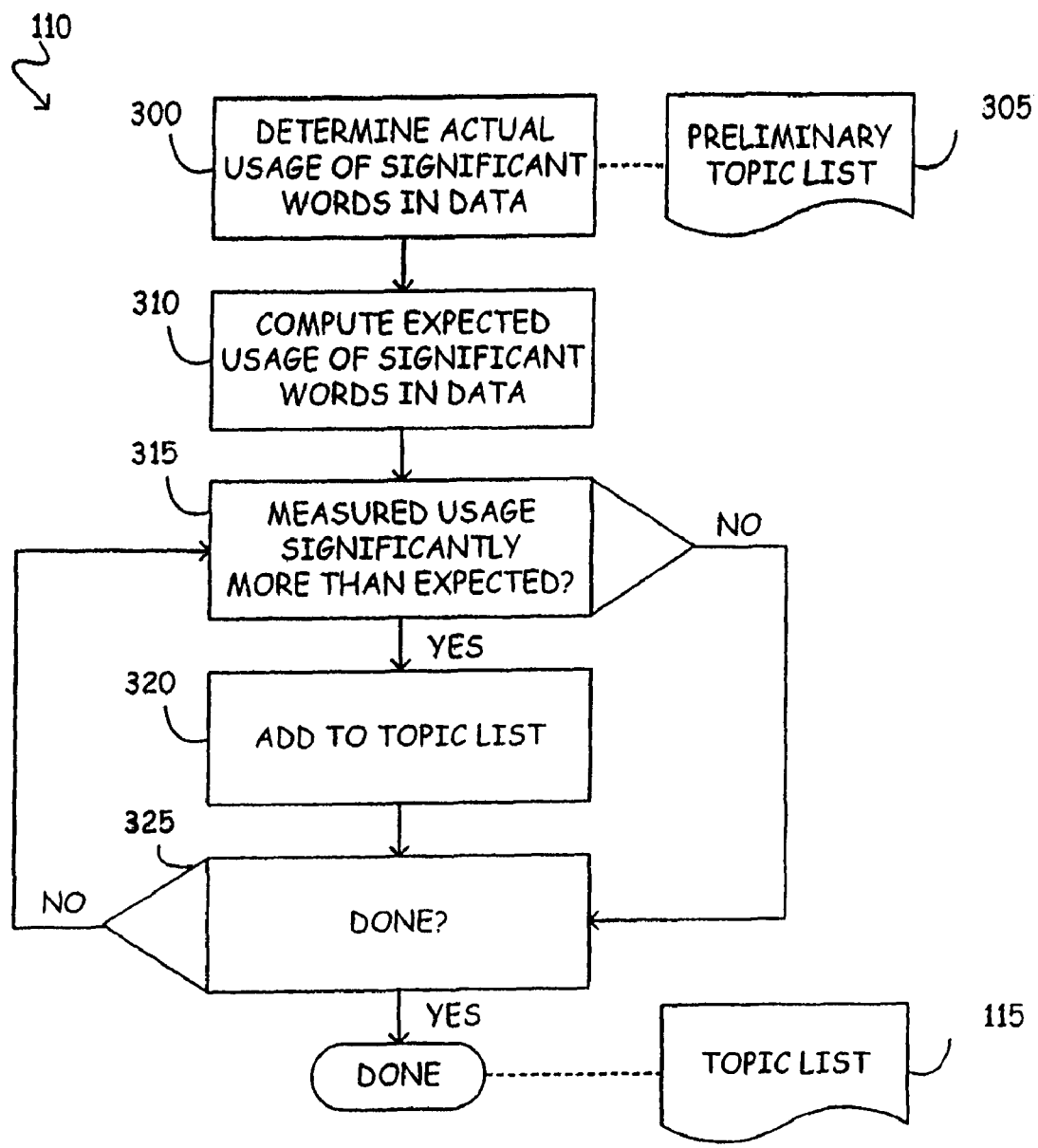
FIG. 3 is a flowchart of a method to identify topics in a corpus of data in accordance with one embodiment of the invention.

FIG. 3 illustrates one method in accordance with the invention to identify topics (block 110 of FIG. 1) in data 105 using word list 100 as a starting point. Initially, data 105 (or a portion thereof) is analyzed on a segment-by-segment basis to determine the actual usage of significant words and word combinations (block 300). A result of this initial step is preliminary topic fist 305. Next, an expected value for each entry in preliminary topic list 305 is computed (block 310) and compared with the actual usage value determined during block 300 (block 315). If the measured actual usage of a preliminary topic list entry is significantly greater than the computed expected value of the entry (the "yes" prong of block 315), that entry is added to topic list 115 (block 320). If the measured actual usage of a preliminary topic list entry is not significantly greater than the computed expected value of the entry (the "no" prong of block 315), that entry is not added to topic list 115. The acts of blocks 315 and 320 are repeated (the "no" prong of block 325) until all preliminary topic list 305 entries have been reviewed (the "yes" prong of block 325).

TABLE 4

Example Topic List

For the data set identified in Tables 1 and 3, 10 of the 35 Gigabytes were used to generate topic list 115. In accordance with FIG. 3, topic list 115 comprised approximately 506,000 entries. In one embodiment, each of these entries are double word entries.
Illustrative topics identified for Medline (9 abstract content in accordance with the invention include: adenine nucleotide, heart disease, left ventricular. atria ventricles, heart failure, muscle, heart rate, fatty acids, loss bone, patient case, bone marrow, and arterial hypertension.

Figure 4:
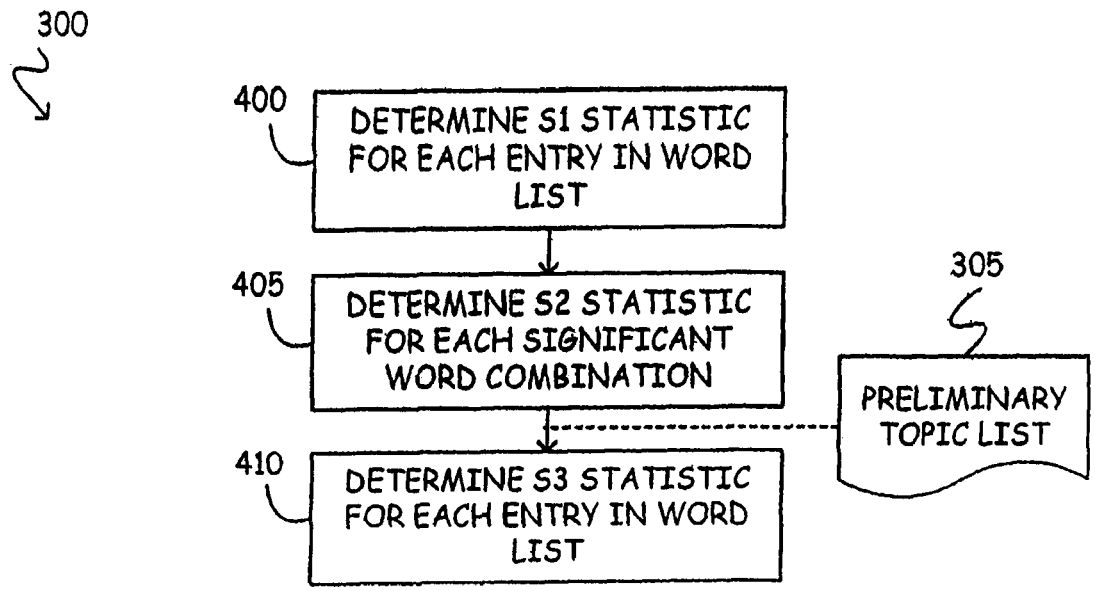
FIG. 4 is a flowchart of a method to measure actual usage of significant words in a corpus of data in accordance with one embodiment of the invention.

As shown in FIG. 4, one method to measure the actual usage of significant words in data 105 (block 300) is to determine three statistics for each entry in word list 100: S1 (block 400); S2 (block 405); and S3 (block 410). In general, statistics S1, S2 and S3 measure the actual frequency of usage of various words and word combinations in data 105 at the granularity of the user-defined segment. More specifically:

Statistic S1 (block 400) is a segment-level frequency count for each entry in word list 100.

For example, if a segment is defined as a paragraph, then the value of S1 for word-i is the number of unique paragraphs in data 105 in which word-i is found.

An S1 value may also be computed for non-word list 100 words if they are identified as part of a word combination as described below with respect to statistic S2.

Statistic S2 (block 405) is a segment-level frequency count for each significant word combination in data 105. Those word combinations having a non-zero S2 value may be identified as preliminary topics 305. In one embodiment, a "significant word combination" comprises any two entries in word list 100 that are in the same segment. In another embodiment, a "significant word combination" comprises any two entries in word list 100 that are in the same segment and contiguous. In still another embodiment, a "significant word combination" comprises any two entries in word list 100 that are in the same segment and contiguous or separated only by one or more STOP words. In yet another embodiment, a "significant word combination" comprises any two words that are in the same segment and contiguous or separated only by one or more STOP words where at least one of the words in the word combination is in word list 100. In still another embodiment a "significant word combination" comprises a two or more word combination appearing in any data item within Data 105. In this embodiment, word list 100 would not be used. In general, a "significant word combination" comprises any two or more words that are in the same segment and separated by 'N' or fewer specified other words: N may be zero or more; and the specified words are typically STOP words. As a practical matter, word combinations comprising non-word list 100 words may be ignored if they appear in less than a specified number of segments in data 105 (e.g., less than 10 segments).

For example, if a segment is defined as a paragraph, then the value of S2 for word-combination-i is the number of unique paragraphs in data 105 in which word-combination-i is found.

Statistic S3 (block 410) indicates the number of unique word combinations (identified by having non-zero S2 values, for example) each word in word list 100 was found in.

For example, if word-z is only a member of word-combination-i, word-combination-j and word-combination-k and the S2 statistic for each of word-combination-i, word-combination-j and word-combination-k is non-zero, then word-z's S3 value is 3.

One method to compute the expected usage of significant words in data 105 (block 310) is to calculate the expected value for each preliminary topic list 305 entry based only on its overall frequency of use in data 105. In one embodiment, the expected value for each word pair in preliminary word list 305 may be computed as follows:

$$\{S1(\text{word-}i) \times S1(\text{word-}j)\} \div N$$

where S1 (word-i) and S1 (word-j) represents the S1 statistic value for word-i and word-j respectively, and N represents the total number of segments in the data corpus being analyzed.

One of ordinary skill in the art will recognize that the equation above may be easily extended to word combinations have more than two words.

Referring again to FIG. 3, with measured and computed usage values it is possible to determine which entries in preliminary topic list 305 are suitable for identifying topics within data 105. In one embodiment, the test (block 315) of whether a topic's measured usage (block 300) is significantly greater than the topic's expected usage (block 310), is a constant multiplier. For example, if the measured usage of preliminary topic list entry-i is twice that of preliminary topic list entry-i is expected usage, preliminary topic list entry-i may be added to topic list 115 in accordance with block 320. In another embodiment of the invention, if the measured usage of preliminary topic list entry-i is greater than a threshold value (e.g., 10) across all segments, then that preliminary topic list entry is selected as a topic. One of ordinary skill in the art will recognize alternative tests may also be used. For example, a different multiplier may be used (e.g., 1.5 or 3). Additionally conventional statistical tests of significance may be used.

Figure 5:
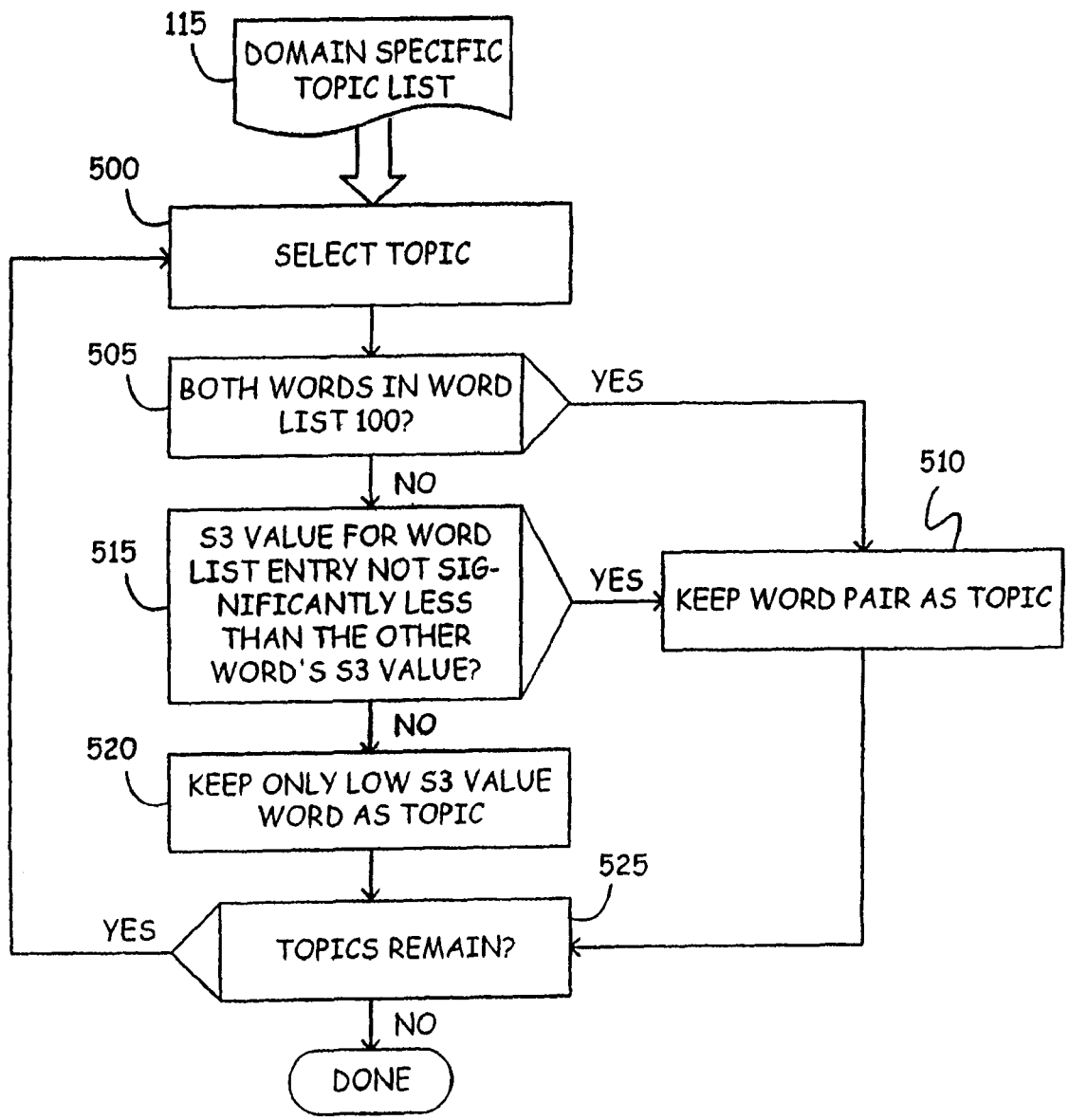
FIG. 5 is a flowchart of a topic refinement process in accordance with one embodiment of the invention.

In one embodiment, topic list 115 may be refined in accordance with FIG. 5. (For convenience, this refinement process will be described in terms of two-word topics. One of ordinary skill in the art will recognize that the technique is equally applicable to topics having more than two words.) As shown, a first two word topic is selected (block 500). If both words comprising the topic are found in word list 100 (the "Yes" prong of block 505), the two word topic is retained (block 510). If both words comprising the topic are not found in word list 100 (the "no" prong of block 505), but the S3 value for that word which is in word list 100 is not significantly less than the S3 value for the other word (the "yes" prong of block 515), the two word topic is retained (block 510). If, on the other hand, one of the topic's words is not in word list 100 (the "no" prong of block 505) and the S3 value for that word which is in word list 100 is significantly less than the S3 value for the other word (the "no" prong of block 515), only the low S3 value word is retained in topic list 115 as a topic (block 520). The acts of blocks 500-520 are repeated as necessary for each two word topic in topic list 115 (see block 525). In one embodiment, the test for significance (block 515) is based on whether the "high" S3 value is in the upper one-third of all S3 values and the "low" S3 value is in the lower one-third of all S3 values. For example, if the S3 statistic for a corpus of data has a range of zero to 12,000, a low S3 value is less then or equal to 4,000 and a "high" S3 value is greater then or equal to 8,000. In another embodiment, the test for significance in accordance with block 515 may be based on quartiles, quintiles or Bayesian tests. Refinement processes such as that outlined in FIG. 5 acknowledge word associations within data, while ignoring individual words that are so prevalent alone (high S3 value) as to offer substantially no differentiation as to content.

Referring again to FIG. 1, once topic list 115 is established, each segment in data 105 may associated with those topics which exist within it (block 120) and stored in database 125. Topics may be associated with a data segment in any desired fashion. For example, topics found in a segment may be stored as metadata for the segment. In addition, stored topics may be indexed for improved retrieval performance during subsequent lookup operations. Empirical studies show that the large majority of user queries are "under-defined." That is, the query itself does not identify any particular subject matter with sufficient specificity to allow a search engine to return the user's desired data in a result set (i.e., that collection of results presented to the user) that is acceptably small. A typical user query may be a single word such as, for example, "kidney." In response to under-defined queries, prior art search techniques generally return large result sets—often containing thousands, or tens of thousands, of "hits." Such large result sets are almost never useful to a user as they do not have the time to go through every entry to find that one having the information they seek.

Figure 6:
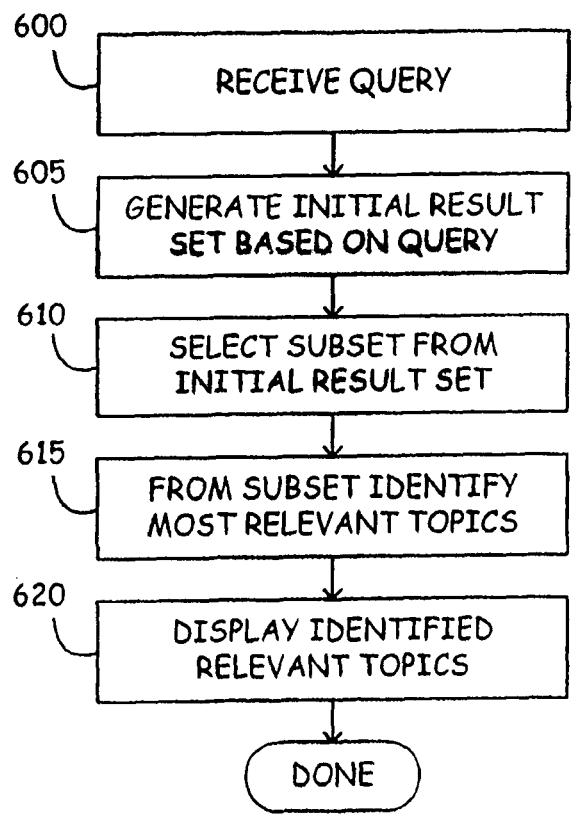
FIG. 6 is a flowchart of a topic identification method in accordance with one embodiment of the invention.

In one embodiment, topics associated with data segments in accordance with the invention may be used to facilitate data retrieval operations as shown in FIG. 6. When a user query is received (block 600) it may be used to generate an initial result set (block 605) in a conventional manner. For example, a literal text search of the query term may identify 100,000 documents (or objects stored in database 125) that contain the search term. From this initial result set, a subset may be selected for analysis in accordance with topics (block 610). In one embodiment, the subset is a randomly chosen 1% of the initial result set. In another embodiment, the subset is a randomly chosen 1,000 entries from the initial result set. In yet another embodiment, a specified number of entries are selected from the initial result set (chosen in any manner desired). While the number of entries in the initial result subset may be chosen in substantially any manner desired, it is preferable to select at least a number that provides "coverage" (in a statistical sense) for the initial result set. In other words, it is desirable that the selected subset mirror the initial result set in terms of topics. With an appropriately chosen result subset, the most relevant topics associated with those results may be identified (block 615) and displayed to the user (block 620).

Figure 7:
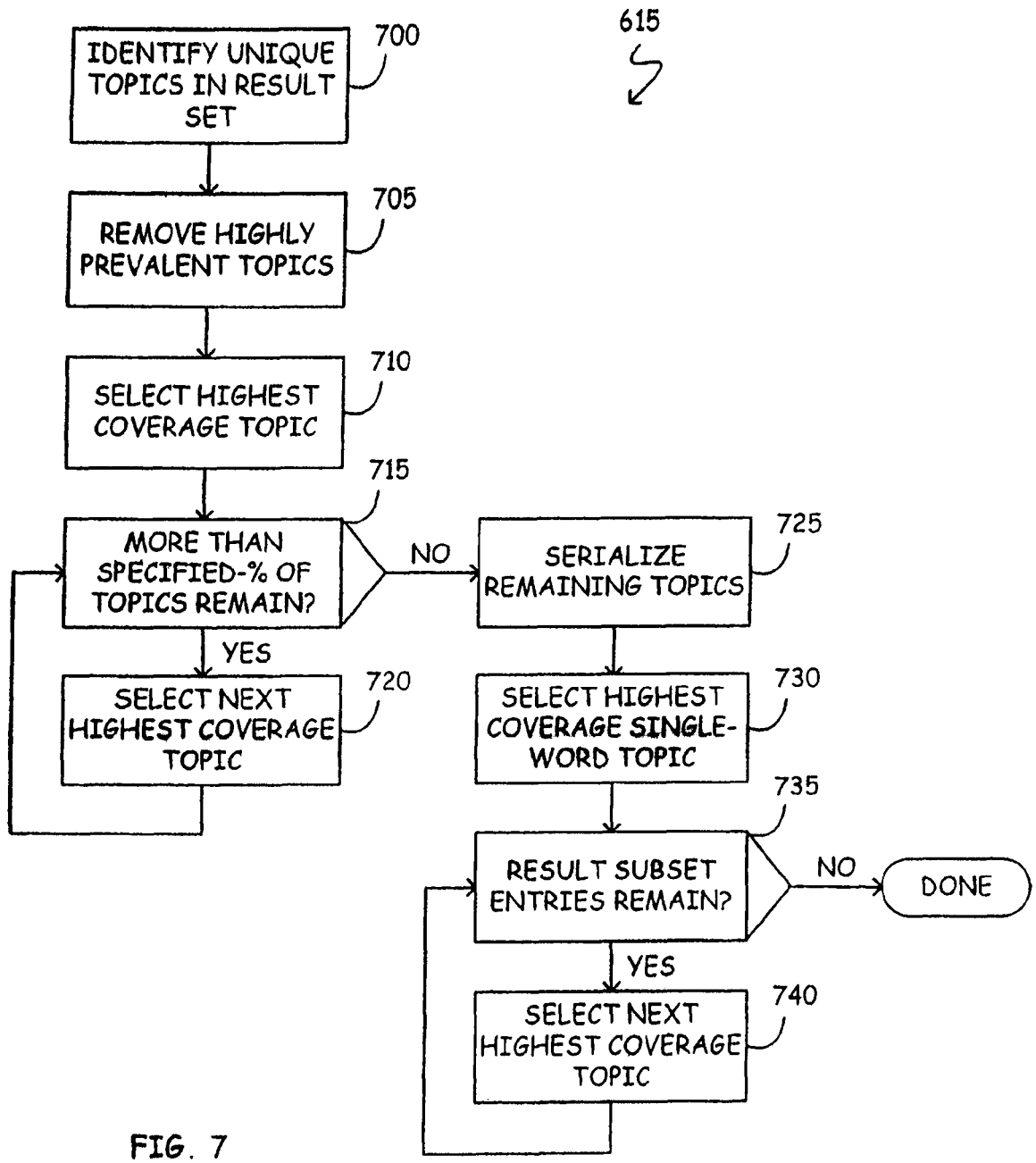
FIG. 7 is a flowchart of one method in accordance with the invention to identify those topics for display during a user query operation.

FIG. 7 shows one method in accordance with the invention to identify those topics for display (block 615). Initially, all unique topics associated with the result subset are identified (block 700), and those topics that appear in more than a specified fraction of the result subset are removed (block 705). For example, those topics appearing in 80% or more of the segments comprising the result subset may be ignored for the purposes of this analysis. (A percentage higher or lower than this may be selected without altering the salient characteristics of the process.) Next, that topic which appears in the most result subset entries is selected for display (block 710). If more than one topic ties for having the most coverage, one may be selected for display in any manner desired. If, after ignoring those result subset entries associated with the selected topic, there remains more than a specified fraction of the result subset (the "yes" prong of block 715), that topic having the next highest coverage is selected (block 720). The process of blocks 715 and 720 is repeated until the remaining fraction of result subset entries is at or below the specified threshold. In one embodiment, the specified threshold of block 715 is 20%, although a percentage higher or lower than this may be selected without altering the salient characteristics of the process.

If, after ignoring those result subset entries associated with the selected topic(s), there remains less than a specified fraction of the result subset (the "no" prong of block 715), the remaining topics are serialized and duplicate words are eliminated (block 725). That is, topics comprising two or more words are broken apart and treated as single-word topics. Next, the single-word topic that appears in the most result subset entries not already excluded is selected for display (block 730). As before, if more than one topic ties for having the most coverage, one may be selected for display in any manner desired. If, after ignoring those result subset entries associated with the selected topic, result subset entries remain un-chosen (the "yes" prong of block 735), that topic having the next highest coverage is selected (block 740). The process of blocks 735 and 740 is repeated until all remaining result subset entries are selected for display (the "no" prong of block 735).

The topics identified in accordance with FIG. 7 may be displayed to the user (block 620 in FIG. 6). Thus, data retrieval operations in accordance with the invention return one or more topics which the user may select to pursue or redefine their initial search. Optionally, a specified number of search result entries may be displayed in conjunction with the displayed topics. By selecting one or more of the displayed topics, a user may be presented with those data corresponding to the selected topics. (Topics may, for example, be combined through Boolean "and" and/or "or" operators.) In addition, the user may be presented with another list of topics based on the "new" result set in a manner described above. In summary, search operations in accordance with the invention respond to user queries by presenting a series of likely topics that most closely reflect the subjects that their initial search query relate to. Subsequent selection of a topic by the user, in effect, supplies additional search information which is used to refine the Search.

TABLE 5

Example Query Result

For the data set identified in Tables 1, 3 and 4, a search on the single word "kidney" returns an initial result set comprising 147,549 hits. (That is, 147,549 segments had the word kidney in them.) Of these, 1,000 were chosen as the initial result subset. Using the specified thresholds discussed above, the following topics were represented in the result set: amino acid, dependent presence, amino terminal, kidney transplantation, transcriptional regulation, liver kidney, body weight, rat kidney, filtration fraction, rats treated, heart kidney, renal transplantation, blood pressure, and renal function. Selection of the "renal function" topic identified a total of 6,853 entries divided among the following topics: effects renal, kidney transplantation, renal parenchyma, glomerular filtration, loss renal, blood flow, histological examination, renal artery, creatinine clearance, intensive care, and renal failure. Selection of the "glomerular filtration" topic from this list identified a total of 1,400 entries. Thus, in two steps the number of "hits" through which a person must search was reduced from approximately 148,000 to 1,500-a reduction of nearly two orders of magnitude.

It is noted that retrieval operations in accordance with FIG. 6 may not be needed for all queries. For example, if a user query includes multiple search words or a quoted phrase that, using literal text-based search techniques, returns a relatively small result set (e.g., 50 hits or fewer), the presentation of this relatively small result set may be made immediately without resort to the topic-based approach of FIG. 6. What size of initial result set that triggers use of a topic-based retrieval operation in accordance with the invention is a matter of design choice. In one embodiment, all initial result sets having more than 50 hits use a method in accordance with FIG. 6. In another embodiment, only initial result sets having more than 200 results trigger use of a method in accordance with FIG. 6.

One of ordinary skill in the art will recognize that various changes in the details of the illustrated operational methods are possible without departing from the scope of the claims. For example, various acts may be performed in a different order from that shown in FIGS. 1 through 7. In addition, usage statistics other than those disclosed herein may be employed to measure a word's (or a word combination's) actual usage in a targeted corpus of data. Further, query result display methods in accordance with FIGS. 6 and 7 may use selection thresholds other than those disclosed herein.

The Relevancy Dilemma

Figure 8:
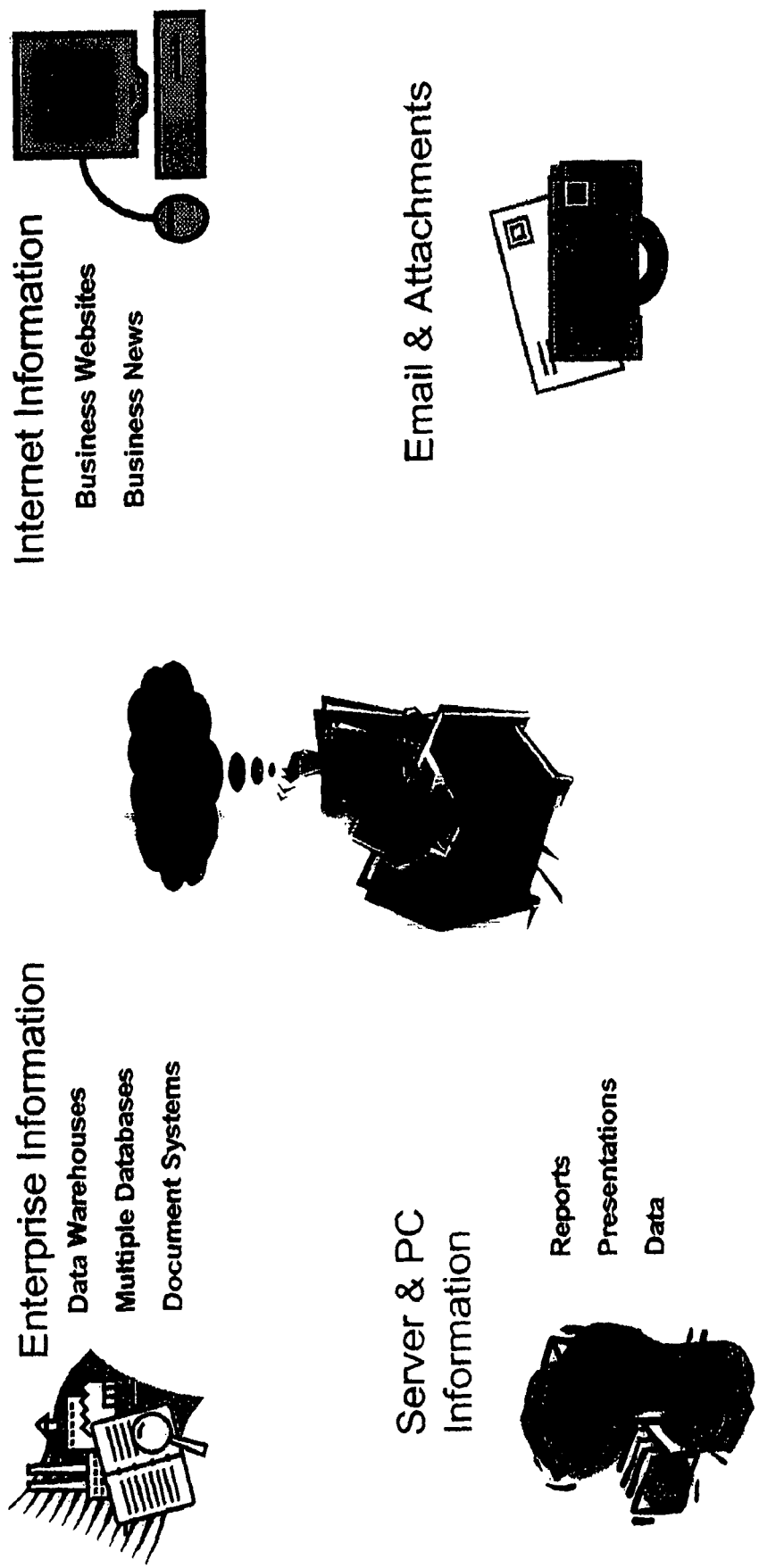
FIG. 8 is a diagram that shows enterprise information sources.

FIG. 8 provides a diagram that shows enterprise information sources.

An office worker seated as his desk in front of the computer with a need to find information has a dilemma. The diagram illustrates that there are at least four main sources of information: enterprise information, server and PC information, Internet information, and email and attachments. Enterprise information can include data warehouses, multiple databases, and document systems. Server and PC information can include reports, presentations and data generated by the worker or his colleagues. Internet information can include a wealth of information, including business websites and business news. These are a few examples of the types of information that can be searched using the present invention, and are not intended to limit the scope of the invention.

The dilemma facing the office worker is where is the information? Can the information be found locally in a file? Is it on the department's server, in a file, in an email, or in an attachment to an email? Is it in a corporate database or warehouse or in a document management system? Or finally, is it on the web?

Information within the enterprise is doubling every five years and doubling every 6 years on the web. And that is not counting the scores of duplicate emails, attachments, and corporate documents. More and more time is being spent trying to find information and less of all the relevant information is being found. So, productivity is negatively affected. The quality of the decisions is poorer because of incomplete information and the risk of negative economic impacts rise.

The first step in addressing the information dilemma is to provide real-time aggregation of information where the context (e.g. title, to, from, name, product, etc.) is identified and maintained. This must be done without requiring normalization of the data. Or, in other words, the information must be imported "as is" without having to reformat or transform the information into some common form. Examples of methods for aggregating the data are taught in commonly owned U.S. Pat. No. 5,842,213, entitled Method for Modeling, Storing and Transferring Data in Neutral Form, issued Nov. 24, 1998 to Odom et al., and U.S. Pat. No. 6,393,426, also entitled Method for Modeling, Storing and Transferring Data in Neutral Form, issued May 21, 2002 to Odom et al., which are herein incorporated by reference in their entireties. These are provided as example methods of modeling and storing data, and are not intended to limit the scope of the present invention.

This aggregation addresses the issue of practically pooling diverse information. The second step relates to the search problem, or put another way, finding the needed information—the proverbial needle in the haystack.

True relevancy is the missing ingredient in search. The industry is looking for ways to produce better results for the user. This is particularly true when the user is searching for specific content as opposed to general information from an omnibus website. The emphasis is on trying to find a way to easily determine which information is relevant to the user.

One part of understanding which information is relevant to the user is by trying to understand the intent of what the user enters for the search. More sophisticated natural language processing (NLP) is required to achieve "intent-based" search. The other part of determining what is relevant to the searcher is to extract that information directly from the person doing the search—effortlessly if possible. Both of these requirements will be resource intensive with current technologies. Search engine vendors already have massive hardware installations. Imagine what a quadrupling of resource requirements would do to the present cost structures. Not to mention the resource logistics. Co-pending, commonly owned U.S. patent application Ser. No. 11/194,766, filed on Aug. 2, 2005, which is hereby included herein by reference in its entirety addresses aspects of this relevancy challenge. The methods provided in that application can be coupled with the methods described herein to further improve the relevancy of search results and topics to be displayed.

Generating Relevant Topics and Search Results

As discussed within the background section, present search and topification algorithms generally assume that topics are relatively static. However, the relevance of topics to a particular search query is not only based on what appears in the content of the query, but the relevance can also be a function of current events. Unfortunately, search engines do not directly factor in time relevancy, and these topics would be mixed in with the tens of thousands of other possible topic results. Thus, a user would not likely receive as relevant search results as would be desired.

Another shortcoming of current search engines that display topics or search results is that search engines do not display topics associated with every subject matter domain related to a search constraint entered by a user. Rather a search engine may only show search results that are most popular without regard to different subject matter domains that search results may belong to. For users interested in a particular domain, the search results displayed would not be particularly relevant and their specific areas of interest difficult to find. Thus, a user once again may not receive search results relevant to their particular area of interest.

In a set of embodiments, the present invention addresses these shortcomings of existing search engines and methods. In particular, embodiments of the present invention provides search methods and systems that can efficiently generate search results to identify and display topics by considering, at any given time, the relative significance of a topic based on current events and that ensure coverage of all subject matter domains associated with a search constraint.

In each of methods 900, 1100 and 1200, discussed below. In an embodiment a topic comprise a word combination of two or more substantially contiguous words. Two words are substantially contiguous if they are separated only by zero or more words selected from a predetermined list of words. In one embodiment, the predetermined list of words are STOP words.

As used herein the set of information includes one or more of information located within an enterprise network, information located within a server, information located within a personal computer, information located on the Internet, or information contained within email messages or email attachments.

Also, as used herein data item includes one or more of text documents, graphic documents, audio files, video files, multimedia documents, email messages, email attachments, or Internet web page.

Figure 9:
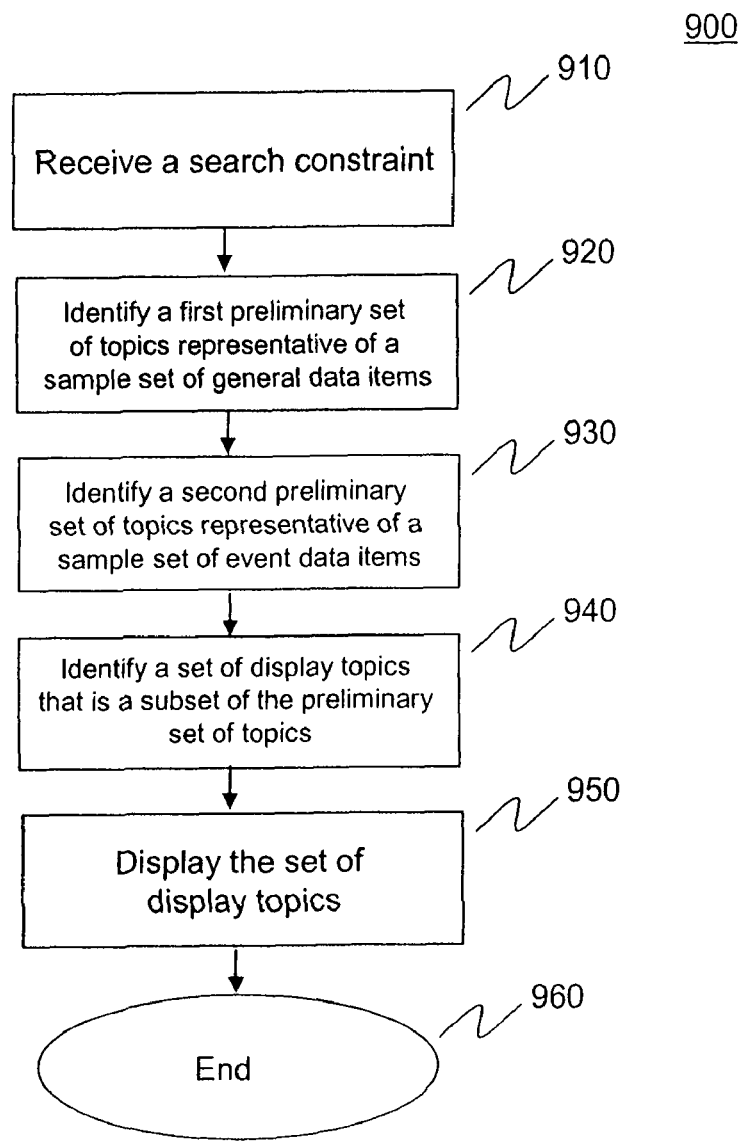
FIG. 9 is a flowchart of a method for displaying topics, according to an embodiment of the invention.

FIG. 9 provides a flowchart of method 900 for displaying topics related to a search constraint entered by a user to request search results that identify data items within a set of information that are related to the search constraint, according to an embodiment of the invention. Method 900 begins in step 910. For use in illustrating the steps in method 900, FIG. 10 will be used. FIG. 10 provides a screen shot of an search engine web site, according to an embodiment of the invention. The screen shot of FIG. 10 is for illustrative purposes, and not intended to limit the scope of the invention.

In step 910 a search constraint is received. For example, referring to FIG. 10 the search constraint is "Pittsburgh Steelers."

In step 920 a first preliminary set of topics related to the search constraint is identified. In an embodiment, the first preliminary set of topics is representative of a sample set of general data items. For example, the general data items could include a generic sampling of data items located across the Internet.

In step 930 a second preliminary set of topics related to the search constraint is identified. In an embodiment, the second preliminary set of topics are representative of a sample set of current event data items. In an embodiment, the sample set of current event data items are gathered by receiving feeds from current event websites, such as CNN.COM, MSN.COM, ESPN.COM and the like. The current event data items are updated periodically. In one embodiment periodic updates are a function of the subject matter. For example, sports information is updated every thirty minutes, financial information is updated every thirty minutes, health information is updated once a day and other news information is updated every two hours. In one embodiment the current event data items database contains approximately 20,000 data items.

In step 940 a set of display topics is identified that is a subset of the first preliminary set of topics and the second preliminary set of topics. In an embodiment, identifying a set of display topics includes selecting a certain number, referred to as the general topic threshold number, of topics from the first preliminary set of topics and selecting a certain number, referred to as the current event topic threshold number of topics, from the second preliminary set of topics. Additionally, in a further embodiment a certain number, referred to as the proper name topic threshold, of proper names from the second preliminary set of topics are also selected. In one embodiment, the proper names are randomly selected from a set of proper names contained within the second preliminary set of topics.

In an additional embodiment, a personal interest topic repository can be created. The personal interest topic repository includes topics that have been identified as relevant to a user. These topics, for example, may be topics associated with frequent searches conducted by a user, topics generated based on a personal profile, or topics that a user may have previously selected. When a personal topic repository is available, step 940 can also include selecting a certain number, referred to as the personal interest topic threshold, of topics from the first preliminary set of topics.

In step 950 the set of display topics identified in step 940 is displayed. The topics may be displayed on a computer terminal, cell phone or other display device. In step 960 method 900 ends.

In an embodiment, the topic display threshold is twenty topics. Of these twenty topics, six topics are identified from the current event topics, six proper names (which are considered topics) are also taken from the current event topics, and eight topics are identified from the general topics. Of the eight topics from the general topics, two of these are personal interest topics, when personal interest topics are available. For example, referring back to FIG. 10, the column labeled AUTOTOPICS displays the set of display topics. The topics include, for example, Franco Harris, Pittsburgh Post, and autographed photos.

Figure 11:
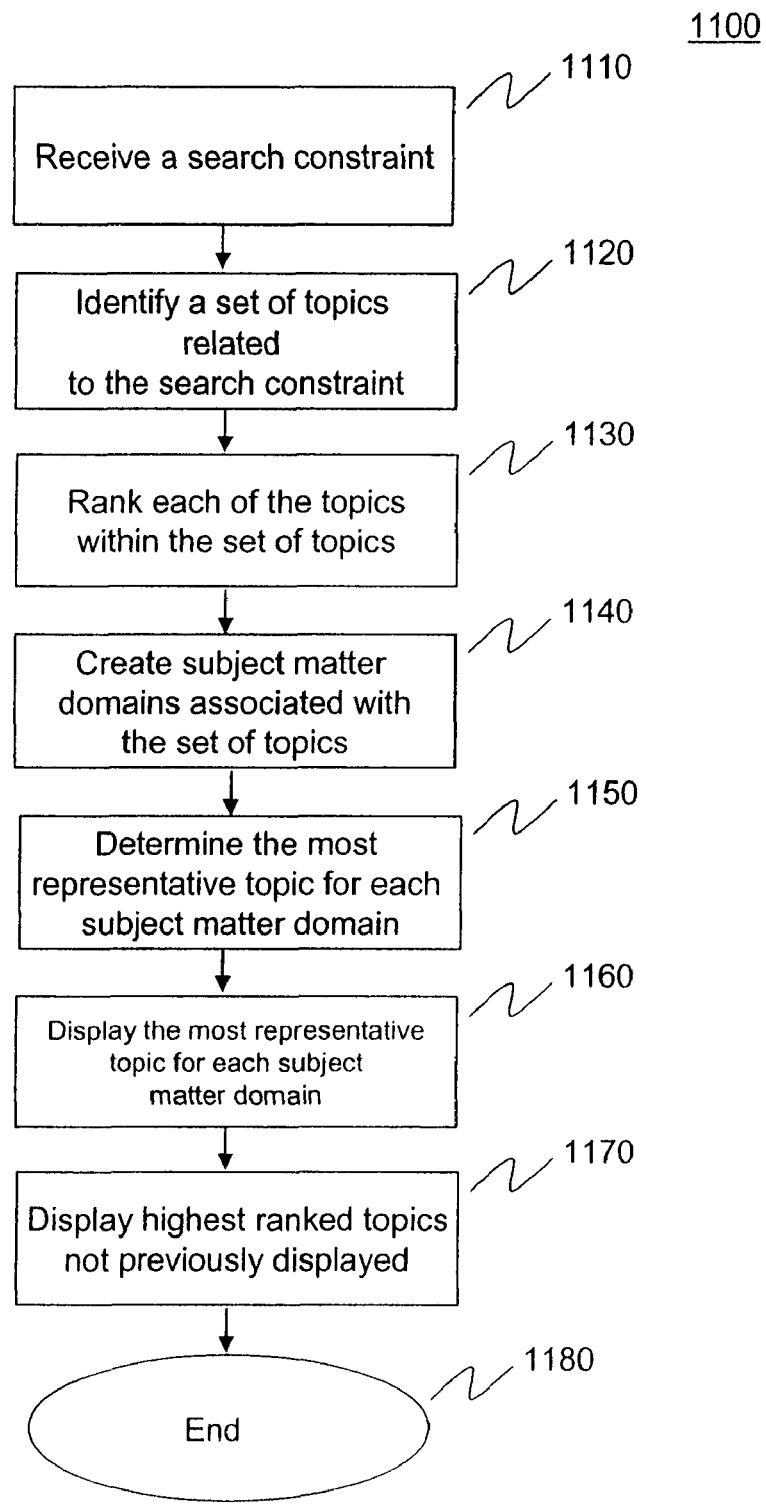
FIG. 11 is a flowchart of a method for displaying topics, according to an embodiment of the invention.

FIG. 11 provides a flowchart of method 1100 for displaying topics related to a search constraint entered by a user to request search results that identify data items within a set of information that are related to the search constraint. For use in illustrating the steps in method 1100, FIG. 10 will again be used. The screen shot of FIG. 10 is for illustrative purposes, and not intended to limit the scope of the invention. Method 1100 begins in step 1110.

In step 1110 a search constraint is received. For example, referring to FIG. 10 the search constraint is "Pittsburgh Steelers."

In step 1120 a set of topics related to the search constraint is identified. In an embodiment identifying a set of topics includes conducting a search to generate search results. The search results include a set of data items. Example searches that can be used include searches using GOOGLE, YAHOO, MSN, ASK.COM and A9 search engines. Other types of search engines can also be used.

In another embodiment a search can be conducted on a representative sample of data within the set of information that is of interest. For example, when searching the Internet a representative set of data items from the Internet can be used. In one embodiment the representative set of data items includes about 25 million data items.

In another embodiment a search can be conducted on data items contained within a current events data item database. As discussed above, in an embodiment, the sample set of current event data items are gathered by receiving feeds from current event websites, such as CNN.COM, MSN.COM, ESPN.COM and the like. The current event data items are updated periodically. In one embodiment periodic updates are a function of the subject matter. For example, sports information is updated every thirty minutes, financial information is updated every thirty minutes, health information is updated once a day and other news information is updated every two hours. In one embodiment the current event data items database contains approximately 20,000 current event data items.

The set of topics can then be determined from the search results by extracting topics associated with each data item in the search results. For example, the topification methods disclosed in the "026 patent application can be used to identify the set of topics from any of the above search results using general data items, representative data items and current event data items. In alternative embodiments, topics can be generated from a combination of these or other source data items.

Figure 13:
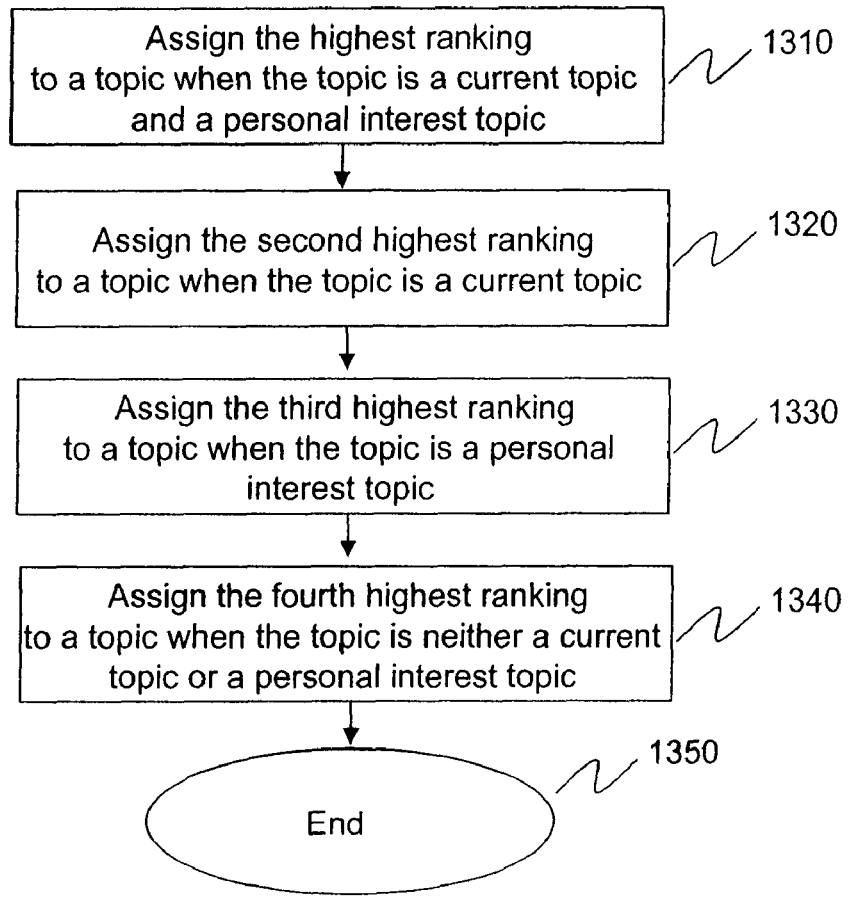
FIG. 13 is a flowchart of a method to rank topics into one of four general rankings, according to an embodiment of the invention.

Once the topics are identified in step 1130 each of the topics within the set of topics are ranked. FIG. 13 provides a flowchart of a method 1300 to rank topics into one of four general rankings. In step 1310, the highest ranking is assigned to a topic when the topic is a current topic and a personal interest topic. A topic is a current topic when it is found in the current event topics. A topic is a personal interest topic when it is found in the personal interest topic repository for a particular user.

In step 1320 the second highest ranking is assigned to a topic within the identified when the topic is a current topic. In step 1330 the third highest ranking is assigned to a topic when the topic is a personal interest topic. In step 1340 the fourth highest ranking is assigned to a topic when the topic is neither a current topic or a personal interest topic. Within each level of ranking, topics are further ranked based on their frequency of occurrence with search result data items. Those topics that occur least frequently among the data items are considered most relevant and given a higher ranking.

Figure 14:
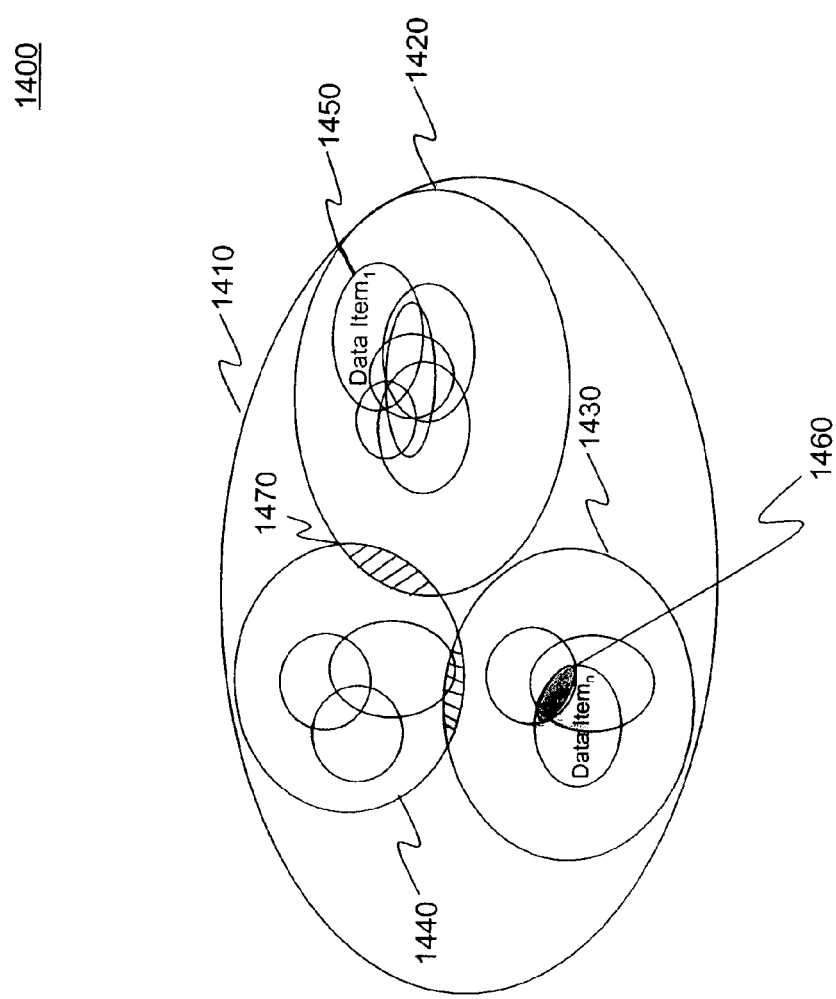
FIG. 14 is a diagram that illustrates topic clustering, according to an embodiment of the invention.

In step 1140 subject matter domains associated the set of topics are created. FIG. 14 provides a diagram that graphically illustrates this process. Set 1410 represents the complete set of topics found in the data items in the search results. Within set 1410, three subject matter domains are illustrated. These are subject matter domains 1420, 1430 and 1440. Subject matter domains include a collection of topics associated with the data items within the search results. For example, subject matter domains includes data item 1450. Associated with data item 1450 will be one or more topics. Data items that have overlapping sets of topics, represented by the shaded area 1460 for subject matter domain 1430, are clustered together to form a subject matter domain. Subject matter domains will have some overlap, as indicated by overlap 1470.

In an embodiment, the process of clustering includes clustering data items that have overlapping topics, and then creating subject matter domains based on clustering of data items that minimizes the overlap of topics across subject matter areas, such as overlap 1470. Individuals skilled in the relevant arts will be able to apply statistical clustering methods to determine the optimal clustering.

In step 1150 the most representative topic for each subject matter domain is determined. In an embodiment, the most representative topic is determined by identifying those topics within a subject matter domain that occur in more than some fraction of the distribution (e.g., more than 90% of the data items) of data items within the set of information. The most representative topic is then determined from this set of topics by identifying the topic for each subject matter domain with the highest current event and personal interest topic ranking. As necessary, the frequency of occurrence of the topics can be used to further rank the topics as discussed above.

In step 1160 the most representative topic for each subject matter domain is displayed. In step 1170 the highest ranked topics not previously displayed are displayed. In step 1180 method 1100 ends.

Figure 12:
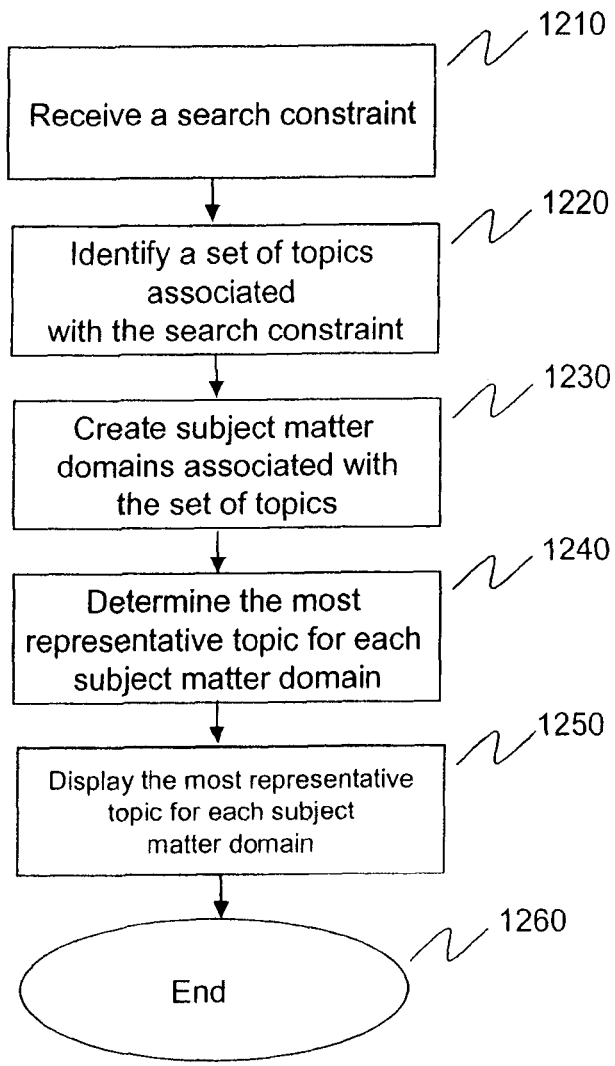
FIG. 12 is a flowchart of a method for displaying topics, according to an embodiment of the invention.

FIG. 12 provides a flowchart of method 1200 for displaying topics related to a search constraint entered by a user to request search results that identify data items within a set of information that are related to the search constraint. For use in illustrating the steps in method 1200, FIG. 10 will again be used. The screen shot of FIG. 10 is for illustrative purposes, and not intended to limit the scope of the invention. Method 1200 begins in step 1210.

In step 1210 a search constraint is received. For example, referring to FIG. 10 the search constraint is "Pittsburgh Steelers."

In step 1220 a set of topics related to the search constraint is identified. In an embodiment identifying a set of topics includes conducting a search to generate search results. The search results include a set of data items. Example searches that can be used include searches using GOOGLE, YAHOO, MSN, ASK.COM and A9 search engines. Other types of search engines can also be used.

In another embodiment a search can be conducted on a representative sample of data within the set of information that is of interest. For example, when searching the Internet a representative set of data items from the Internet can be used. In one embodiment the representative set of data items includes about 25 million data items.

In another embodiment a search can be conducted on data items contained within a current event data item database. As discussed above, in an embodiment, the sample set of current event data items are gathered by receiving feeds from current event websites, such as CNN.COM, MSN.COM, ESPN.COM and the like. The current event data items are updated periodically. In one embodiment periodic updates are a function of the subject matter. For example, sports information is updated every thirty minutes, financial information is updated every thirty minutes, health information is updated once a day and other news information is updated every two hours. In one embodiment the current event data items database contains approximately 20,000 current event data items.

The set of topics can then be determined from the search results by extracting topics associated with each data item in the search results. For example, the topification methods disclosed in the "026 patent application can be used to identify the set of topics from any of the above search results using general data items, representative data items and current event data items. In alternative embodiments, topics can be generated from a combination of these or other source data items.

In step 1230 subject matter domains associated the set of topics are created. As discussed above, FIG. 14 provides a diagram that graphically illustrates this process. Set 1410 represents the complete set of topics found in the data items in the search results. Within set 1410, three subject matter domains are illustrated. These are subject matter domains 1420, 1430 and 1440. Subject matter domains include a collection of topics associated with the data items within the search results. For example, subject matter domains includes data item 1450. Associated with data item 1450 will be one or more topics. Data items that have overlapping sets of topics, represented by the shaded area 1460 for subject matter domain 1430, are clustered together to form a subject matter domain. Subject matter domains will have some overlap, as indicated by overlap 1470.

In an embodiment, the process of clustering includes clustering data items that have overlapping topics, and then creating subject matter domains based on clustering of data items that minimizes the overlap of topics across subject matter areas, such as overlap 1470. Individuals skilled in the relevant arts will be able to apply statistical clustering methods to determine the optimal clustering.

In step 1240 the most representative topic for each subject matter domain is determined. In an embodiment, the most representative topic is determined by identifying those topics within a subject matter domain that occur in more than some fraction of the distribution of data items (e.g., more than 90% of the data items) within the set of information. The most representative topic is then determined from this set of topics by identifying the topic for each subject matter domain that has the least frequent number of occurrences in the search result data items.

In step 1250 the most representative topic for each subject matter domain is displayed. In step 1250 method 1200 ends. In alternative embodiments, the set of topics identified that are related to the search constraint can be ranked as was done in step 1130 in method 1100. Based on these rankings, additional topics can be displayed as was done in step 1170 in method 1100.

Programmable Control Device Implementations

Figure 15:
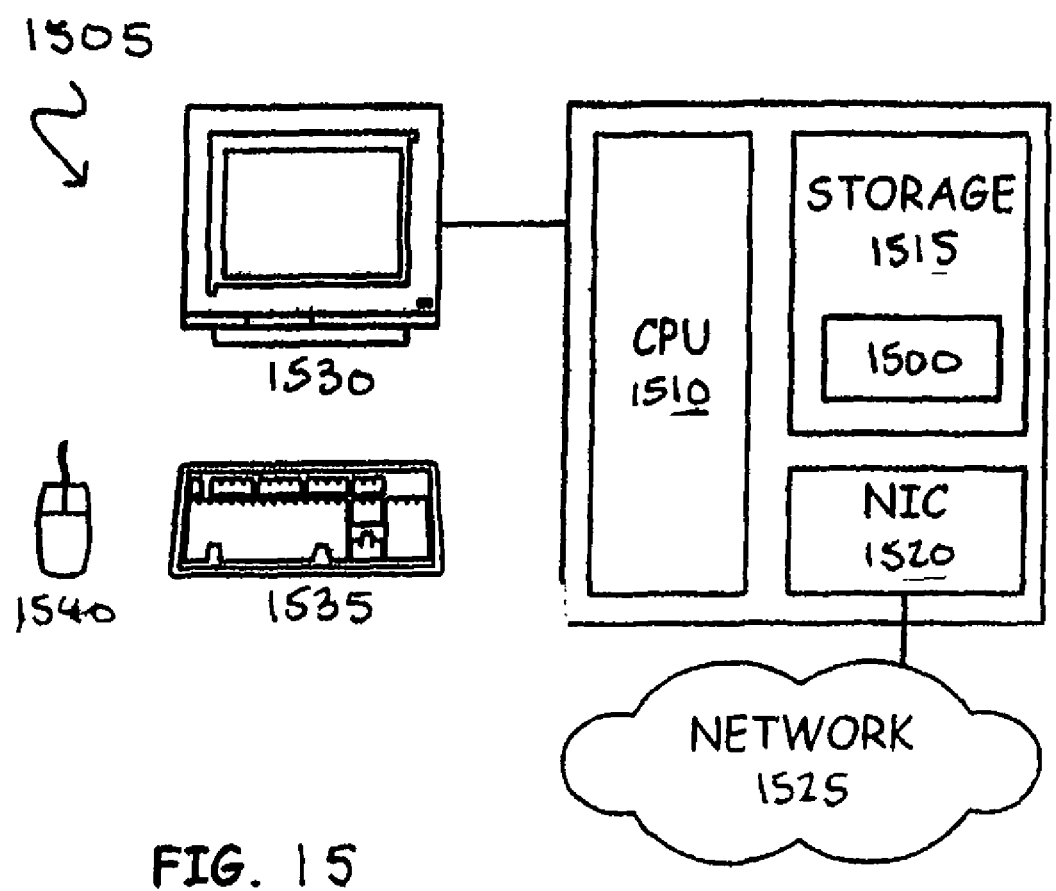
FIG. 15 is a block diagram of a system, according to an embodiment of the invention.

Referring to FIG. 15, acts in accordance with any, or a portion of any, of FIGS. 1 through 14 may be performed by a programmable control device executing instructions organized into one or more program modules 1500. A programmable control device can include, but is not limited to a personal computer, a laptop computer, a network computer, a wireless telephone, a personal data assistant ("PDA") and the like. In one embodiment, programmable control device comprises computer system 1505 that includes central processing unit 1510, storage 1515, network interface card 1520 for coupling computer system 1505 to network 1525, display unit 1530, keyboard 1535 and mouse 1540. In addition to a single processor system shown in FIG. 15, a programmable control device may be a multiprocessor computer system or a custom designed state machine.

Custom designed state machines may be embodied in a hardware device such as a printed circuit board comprising, discrete logic, integrated circuits, or specially designed Application Specific Integrated Circuits (ASICs). Storage devices, such as device 1515, suitable for tangibly embodying program module(s) 1500 include all forms of non-volatile memory including, but not limited to: semiconductor memory devices such as Electrically Programmable Read Only Memory (EPROM), Electrically Erasable Programmable Read Only Memory (EEPROM), and flash devices; magnetic disks (fixed, floppy, and removable); other magnetic media such as tape; and optical media such as CD-ROM disks.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method, comprising:
a computer system receiving a search constraint;
the computer system identifying a first preliminary set of search results by performing a search of a first set of data items using the search constraint;
the computer system identifying a second preliminary set of search results by performing a search of a second set of data items using the search constraint, wherein the second set of data items is obtained from a set of websites that are each updated at least daily;
the computer system identifying a set of final search results that comprises data from the first preliminary set of search results and the second preliminary set of search results, the computer system ranking final search results within the set of final search results such that final search results from the second preliminary set of search results are grouped separately from final search results that are not from the second preliminary set of search results; and
the computer system providing the set of final search results over a network for display according to the ranking.

2. The method of claim 1, further comprising:
using the first preliminary set of search results, the computer system identifying a set of general data topics; and
using the second preliminary set of search results, the computer system identifying a set of current event topics;
wherein the set of final search results comprises display topics selected from the set of general data topics and the set of current event topics.

3. The method of claim 2, wherein the display topics comprise:
a first quantity of topics of the set of general data topics, wherein the first quantity of topics is less than or equal to a specified general data topic threshold number; and
a second quantity of topics of the current event topics, wherein the second quantity of topics is less than or equal to a specified current event topic threshold number.

4. The method of claim 2 wherein:
the first set of data items comprises data available to a search application via the internet; and
the second set of data items includes periodically updated data items in a first category of information that is selected from the group consisting of: sports information, financial information, health information, and general news information.

5. The method of claim 4, wherein:
the second set of data items further includes periodically updated data items in a second category of information; and
the data items in the first category information are updated at a different frequency than the frequency at which the data items in the second category of information are updated.

6. The method of claim 2, further comprising:
the computer system identifying a set of personal interest topics corresponding to topics identified as relevant to a user.

7. The method of claim 6, wherein:
said ranking final search results includes ranking the display topics; and
said providing the set of final search results includes providing the display topics.

8. The method of claim 7, wherein said ranking comprises:
assigning a highest ranking to a display topic that is identified as both a current event topic and a personal interest topic;
assigning a second highest ranking to a display topic that is identified as a current event topic, and is not identified as a personal interest topic;
assigning a third highest ranking to a display topic that is identified as a personal interest topic, and is not identified as a current event topic; and
assigning a fourth highest ranking to a display topic that is not identified as either a current topic or a personal interest topic.

9. The method of claim 7, wherein:
said providing the final search results comprises determining, for each of a plurality of subject matter domains, a representative topic to be displayed; and
the representative topic is selected from the display topics based at least in part on the ranking of the display topics.

10. The method of claim 2, wherein said identifying the set of general data topics comprises:
the computer system determining a frequency at which entries of a topic word list occur in the first preliminary set of search results.

11. The method of claim 2, wherein said identifying the set of general data topics comprises:
the computer system determining a frequency at which combinations of two or more entries of a topic word list occur in the first preliminary set of search results.

12. The method of claim 2, wherein said identifying the set of general data topics comprises:
the computer system determining a quantity of unique combinations of two or more entries of a topic word list that occur in the first preliminary set of search results.

13. A system comprising:
a processor;
an network interface coupled to the processor; and
memory, coupled to the processor, storing program instructions executable by the system to cause the system to:
receive a search constraint;
identify a set of general data topics using a first preliminary set of search results obtained from a search of a first set of data items using the search constraint;
identify a set of current event topics using a second preliminary set of search results obtained from a search of a second set of data items using the search constraint, wherein the second set of data items is obtained from a set of websites that are each updated at least daily;
identify a set of display topics that are selected from the set of general data topics and the set of current event topics; and
provide the set of display topics for display.

14. The system of claim 13, wherein:
the first set of data items comprises data available to a search application via the internet; and
the second set of data items comprises a first category of information that is selected from the group consisting of: sports information, financial information, health information, and general news information.

15. The system of claim 14, wherein:
the second set of data items further comprises a second category of information; and
the second set of data items is periodically updated by updating the first category of information at a different frequency than the frequency at which the second category of information is updated.

16. The system of claim 13, wherein:
the program instructions are further executable by the system to cause the system to rank topics of the set of display topics; and
said providing the set of display topics for display comprises providing the topics of the set of display topics for display according to the ranking of the topics.

17. The system of claim 16, wherein:
the program instructions are further executable by the system to cause the system to identify a set of personal interest topics corresponding to topics identified as relevant to a user; and
the ranking the topics of the set of display topics comprises:
assigning a highest ranking to a topic that is identified as both a current event topic and a personal interest topic;
assigning a second highest ranking to a topic that is identified as a current event topic, and is not identified as a personal interest topic;
assigning a third highest ranking to a topic that is identified as a personal interest topic, and is not identified as a current event topic; and
assigning a fourth highest ranking to a topic that is not identified as either a current topic or a personal interest topic.

18. The system of claim 13, wherein:
the program instructions are further executable by the system to cause the system to:
identify a plurality of subject matter domains associated with the set of display topics; and
identify, for each of the plurality of subject matter domains, a representative topic that is selected from the set of display topics; and
said providing the set of display topics for display comprises providing the representative topic for each of the plurality of subject matter domains.

19. A computer-readable medium having stored thereon computer-executable instructions that, if executed by a system, cause the system to perform a method comprising:
identifying a set of general data topics associated with a first preliminary set of search results obtained from a search of a first set of data items using a search constraint;
identifying a set of current event topics associated with a second preliminary set of search results obtained from a search of a second set of data items using the search constraint, wherein the second set of data items is obtained from a set of websites that are each updated at least daily;
identifying a set of display topics that comprises topics of the set of general data topics and topics of the set of current event topics; and
providing the set of display topics for display.

20. The computer-readable medium of claim 19, wherein:
the first set of data items comprises data available to a search application via the interne;
the second set of data items comprises a first category of information and a second category of information; and
the second set of data items is periodically updated by updating the first category of information at a different frequency than the frequency at which the second category of information is updated.

21. The computer-readable medium of claim 19, wherein:
the method further comprises ranking topics of the set of display topics; and
said providing the set of display topics for display comprises providing the topics of the set of display topics for display according to the ranking.

22. The computer-readable medium of claim 19, wherein said identifying the set of general data topics comprises determining a frequency at which entries of a topic word list occur in the first preliminary set of search results.

23. The computer-readable medium of claim 19, wherein said identifying the set of general data topics comprises determining a frequency at which combinations of two or more entries of a topic word list occur in the first preliminary set of search results.

24. The computer-readable medium of claim 19, wherein said identifying the set of general data topics comprises determining a frequency at which combinations of two or more entries of a topic word list occur in the first preliminary set of search results.

25. The computer-readable medium of claim 19, wherein the set of display topics comprise:

a first quantity of topics of the set of general data topics, wherein the first quantity of topics is less than or equal to a specified general data topic threshold number; and a second quantity of topics of the current event topics, wherein the second quantity of topics is less than or equal to a specified current event topic threshold number.

* * * * *

UNITED STATES PATENT AND TRADEMARK OFFICE
CERTIFICATE OF CORRECTION

| | |
|---|---|
| PATENT NO. | : 7,716,207 B2 |
| APPLICATION NO. | : 11/712557 |
| DATED | : May 11, 2010 |
| INVENTOR(S) | : Paul S. Odom et al. |

Page 1 of 1

It is certified that error appears in the above-identified patent and that said Letters Patent is hereby corrected as shown below:

| Column, Line | Reads | Should Read |
|---|---|---|
| Column 21, Line 13 | "an network" | --a network-- |
| Column 22, Line 38 | "via the interne;" | --via the internet;-- |

Signed and Sealed this

Third Day of August, 2010

David J. Kappos
*Director of the United States Patent and Trademark Office*